(12) United States Patent
Ours et al.

(10) Patent No.: US 7,080,730 B2
(45) Date of Patent: Jul. 25, 2006

(54) CONVEYOR ASSEMBLY

(75) Inventors: David C. Ours, Marshall, MI (US); Randall Cary, Battle Creek, MI (US); Gary Stolhanske, Crystal, MN (US); Stanley Davis, Maple Grove, MN (US)

(73) Assignee: Kellogg Company, Battle Creek, MI (US)

( * ) Notice: Subject to any disclaimer, the term of this patent is extended or adjusted under 35 U.S.C. 154(b) by 0 days.

(21) Appl. No.: 10/899,953

(22) Filed: Jul. 27, 2004

(65) Prior Publication Data

US 2005/0061628 A1 Mar. 24, 2005

Related U.S. Application Data

(60) Provisional application No. 60/491,817, filed on Aug. 1, 2003.

(51) Int. Cl.
*B65G 21/00* (2006.01)
*B65G 21/10* (2006.01)
*B65G 21/14* (2006.01)
B65G 17/36 (2006.01)
B65G 47/34 (2006.01)

(52) U.S. Cl. .................. 198/861.1; 198/588; 198/709; 198/710; 198/703; 198/812; 198/701; 198/550.7

(58) Field of Classification Search ............. 198/861.1, 198/588, 701, 709, 710, 703, 812
See application file for complete search history.

(56) References Cited

U.S. PATENT DOCUMENTS

| | | | |
|---|---|---|---|
| 98,848 A * | 1/1870 | Chanute et al. ............. | 198/509 |
| 147,944 A | 2/1874 | Keen et al. | |
| 734,371 A | 7/1903 | Schuler | |
| 887,242 A * | 5/1908 | Frank ....................... | 198/861.1 |
| 1,061,394 A | 5/1913 | Michener, Jr. | |
| 1,466,724 A * | 9/1923 | McMeans ................ | 198/861.1 |
| 1,992,046 A * | 2/1935 | Shomaker .................... | 198/709 |
| 2,011,978 A * | 8/1935 | Marks ....................... | 198/861.1 |
| 2,013,215 A * | 9/1935 | Langenberg ................ | 198/525 |
| 2,074,595 A * | 3/1937 | Shackelford ................ | 198/835 |
| 2,683,522 A | 7/1954 | Mercier | |
| 2,702,625 A | 2/1955 | Hapman | |
| 3,066,817 A * | 12/1962 | Bradshaw et al. .......... | 414/505 |
| 3,260,352 A * | 7/1966 | Sheridan ..................... | 198/710 |
| 3,578,183 A | 5/1971 | Larger | |
| 3,688,893 A | 9/1972 | Wallace, Jr. | |

(Continued)

FOREIGN PATENT DOCUMENTS

DE 84 205 C 11/1895

(Continued)

Primary Examiner—Gene O. Crawford
Assistant Examiner—Leslie A. Nicholson, III
(74) Attorney, Agent, or Firm—Dickinson Wright PLLC (57) ABSTRACT

The invention provides an apparatus including a conveying member defining a loop that may be used for transferring a product into a container. The conveying member can be a belt, a chain, or plurality of hinged plates. The invention also includes first and second supporting members individually disposed at opposite sides of the loop and spaced a first distance apart from one another. The first and second supporting members support rotating movement of the conveying member. The invention also includes a moving device operable to translate the first and second supporting members concurrently along a path having at least one bend. The lengths of the portions of the conveying member disposed on opposite sides of the bend can be adjusted by the moving device.

7 Claims, 8 Drawing Sheets

U.S. PATENT DOCUMENTS

| | | | |
|---|---|---|---|
| 3,743,078 A * | 7/1973 | Pittoreau | 198/860.3 |
| 3,847,290 A | 11/1974 | Suykens | |
| 3,848,728 A * | 11/1974 | Leibrick et al. | 198/370.04 |
| 4,042,035 A | 8/1977 | Boyer | |
| 4,227,609 A | 10/1980 | Gunther et al. | |
| 4,268,204 A | 5/1981 | Stellfox et al. | |
| 4,333,561 A | 6/1982 | Schlegel | |
| 4,355,714 A | 10/1982 | Chever | |
| 4,456,119 A | 6/1984 | Hout | |
| 4,738,578 A | 4/1988 | Johnston | |
| 4,763,955 A | 8/1988 | Justice | |
| 4,770,287 A | 9/1988 | Glowatzki | |
| 4,860,884 A | 8/1989 | Kostrewa | |
| 4,883,167 A | 11/1989 | Shibata | |
| 4,890,722 A | 1/1990 | Gough | |
| 5,046,603 A * | 9/1991 | Odenthal | 198/812 |
| 5,143,203 A | 9/1992 | Hinner | |
| 5,336,417 A | 8/1994 | Hannum | |
| 5,564,878 A | 10/1996 | Kay | |
| 5,637,183 A * | 6/1997 | Borner | 156/547 |
| 5,641,057 A | 6/1997 | Chorlton | |
| 5,651,447 A | 7/1997 | Huang | |
| 5,685,683 A | 11/1997 | Becker et al. | |
| 5,769,206 A * | 6/1998 | Miyazawa et al. | 198/712 |
| 5,807,054 A | 9/1998 | Seymour | |
| 5,809,922 A | 9/1998 | Nelson | |
| 5,848,683 A | 12/1998 | Seymour | |
| 5,960,927 A * | 10/1999 | Bahr | 198/347.1 |
| RE36,467 E | 12/1999 | Seymour | |
| 6,009,993 A | 1/2000 | Turcheck, Jr. | |
| 6,032,786 A | 3/2000 | Svensson | |
| 6,334,527 B1 | 1/2002 | Kitamura | |
| 6,494,324 B1 | 12/2002 | Ours et al. | |
| 2002/0130016 A1 | 9/2002 | Scholz | |

FOREIGN PATENT DOCUMENTS

| | | |
|---|---|---|
| DE | 574 994 C | 4/1933 |
| DE | 621 624 C | 11/1935 |
| DE | 30 06 623 A | 8/1981 |
| DE | 3006623 A * | 8/1981 |
| DE | 3340322 A1 * | 5/1985 |
| DE | 44 39 970 A | 5/1996 |
| DE | 4439970 A1 * | 5/1996 |

* cited by examiner

CONVEYOR ASSEMBLY

CROSS REFERENCE TO RELATED APPLICATIONS

This application claims the benefit of U.S. Provisional Patent Application Ser. No. 60/491,817 for a CONVEYOR ASSEMBLY, filed on Aug. 1, 2003, which is hereby incorporated by reference in its entirety. This claim is made under 35 U.S.C. § 119(e); 37 C.F.R. § 1.78; and 65 Fed. Reg. 50093.

1. Field of the Invention

The subject invention relates to a conveyor assembly for transferring a product, such as a food product, into a container suitable for bulk transport.

2. Description of the Related Art

Endless conveyors are used to transport materials or articles of manufacture over a distance. The conveyors include a conveying member such as belt rotating around at least a pair of spindles. Conveyors can include a plurality of containers mounted to the belt. Material or articles are moved to each container at a first location along the conveyor, such a loading point. Material or articles are removed from each container at a second location along the conveyor, such as a discharge point.

In some applications, it can be desirable to move the conveyor in order to enhance the efficiency of the transporting operation. For example, a pile of material can shift or shrink during removal. Therefore, moving the loading point towards the pile as the pile shrinks increases the likelihood that each container will be filled with material. Also, certain types of material can be damaged if dropped too far. Therefore, moving the discharge point to maintain a predetermined drop as the size of the pile increases.

SUMMARY OF THE INVENTION

The invention provides an apparatus including a conveying member defining a loop. The conveying member can be a belt, a chain, or plurality of hinged plates. The invention also includes first and second supporting members individually disposed at opposite sides of the loop and spaced a first distance apart from one another. The first and second supporting members support rotating movement of the conveying member. The invention also includes a moving device operable to translate the first and second supporting members concurrently along a path having at least one bend. The lengths of the portions of the conveying member disposed on opposite sides of the bend can be adjusted by the moving device.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, the invention includes a conveying member defining a loop 98, first and second supporting members individually disposed at opposite sides of said loop 98 and spaced a first distance apart from one another, and a moving device 102 operable to translate the first and second supporting members concurrently along a path 104 having at least one bend 106. In the exemplary embodiment of the invention set forth below, the conveying member is formed as a belt 80, the first supporting member is formed as a pulley 92, and the second supporting member is formed as a pulley 94. A bendable frame assembly 108 extends between the first and second supporting members and the moving device 102 includes a bracket 76 fixedly associated with the bendable frame assembly 108, first and second sprockets 46, 48 disposed on opposite sides of the bracket 76, a chain 50 engaged with the bracket 76 and extending around both of said first and second sprockets 46, 48, and a motor 44 operable to rotate one of said first and second sprockets 46,48.

The exemplary embodiment of the invention is further defined as a conveyor assembly shown at 20 in FIGS. 1–5 and 8–11. The conveyor assembly 20 can translate and/or lower a product (not shown) into a container 22 suitable for bulk transport. In addition, the conveyor assembly 20 can adjust a discharge point in a controlled manner. In one application of the exemplary embodiment, the conveyor assembly 20 lowers food, such as cereal, into a large bag 22, which is suitable for bulk transport, see FIG. 1. In particular, the adjustable discharge point moves vertically as the bag 22 fills with food which significantly reduces the amount of breakage of the food into the bag 22. Of course, the conveyor assembly 20 could be used to gently lower any type of product into any type of container or space for any type of application. As an alternative, the conveyor assembly 20 could be configured to raise a product out of a container wherein the position of the pick-up point would be adjusted in a controlled manner. As another alternative, the conveyor assembly 20 could be configured to only move a product horizontally or vertically.

In a non-limiting preferred embodiment of the invention, the conveyor assembly 20 of the subject invention includes a substantially straight portion 118 with both vertical and horizontal portions 120, 122 for lowering a food into a container. The first supporting member 92 navels along the horizontal portion 122 and the second supporting member 94 travels in the vertical portion 120 in the exemplary embodiment of the invention. In alternative embodiments of the invention, a portion of the path 104 traveled by the first supporting member 92 could include vertical and horizontal components. In other words, during movement of the first supporting member 92 toward the bend 106, the first supporting member 92 could move vertically, upwardly or downwardly. Similarly, the second supporting member 94 could move in both the vertical and horizontal portions 120, 122. The preferred conveyor assembly 20 gently lowers the product to a position just inches away from a bottom of the container 22 and then raises as the top of a pile of product raises. This non-limiting preferred embodiment is primarily formed of two major components, namely a support frame 24 and a closed conveyor 26, and is discussed in greater detail below.

Referring to FIGS. 1–4, the support frame 24 includes two parallel rails 28 mounted to a main frame 30. The rails 28 have a horizontal portion and a vertical portion with a curved transition portion disposed between the horizontal and vertical portions. The rails 28 also include first 32 and second 34 ends with the first end 32 at the beginning the horizontal portion and the second end 34 at the end of the vertical portion. Each rail 28 includes a corresponding guide slot 36 for supporting and guiding a portion of the closed conveyor 26 through the horizontal, curved transition, and vertical portions. The rails 28 are curved and include both horizontal and vertical portions to accommodate space requirements. In other words, the resultant L-shaped rails 28 occupy less space than a purely vertical rail. It should be appreciated that the rails 28 may include additional curved transition portions to accommodate varying space requirements. For example, the rails 28 may have U-shaped or Z-shaped configurations.

A number of belt support wheels 38 are mounted to the support frame 24 for supporting a portion of the closed conveyor 26. A belt drive sprocket 40 is also mounted to the support frame 24. The belt drive sprocket 40 is located at the transition portion of the rails 28. A belt drive motor 42 is further mounted to the support frame 24 and is connected to the belt drive sprocket 40. The belt drive motor 42 turns the belt drive sprocket 40 in a clockwise manner as viewed in FIG. 1. The belt drive motor 42, belt drive sprocket 40, and belt support wheels 38 work in conjunction to support and drive a portion of the closed conveyor 26 in a continuous manner as will be discussed in greater detail below.

Figure 2:
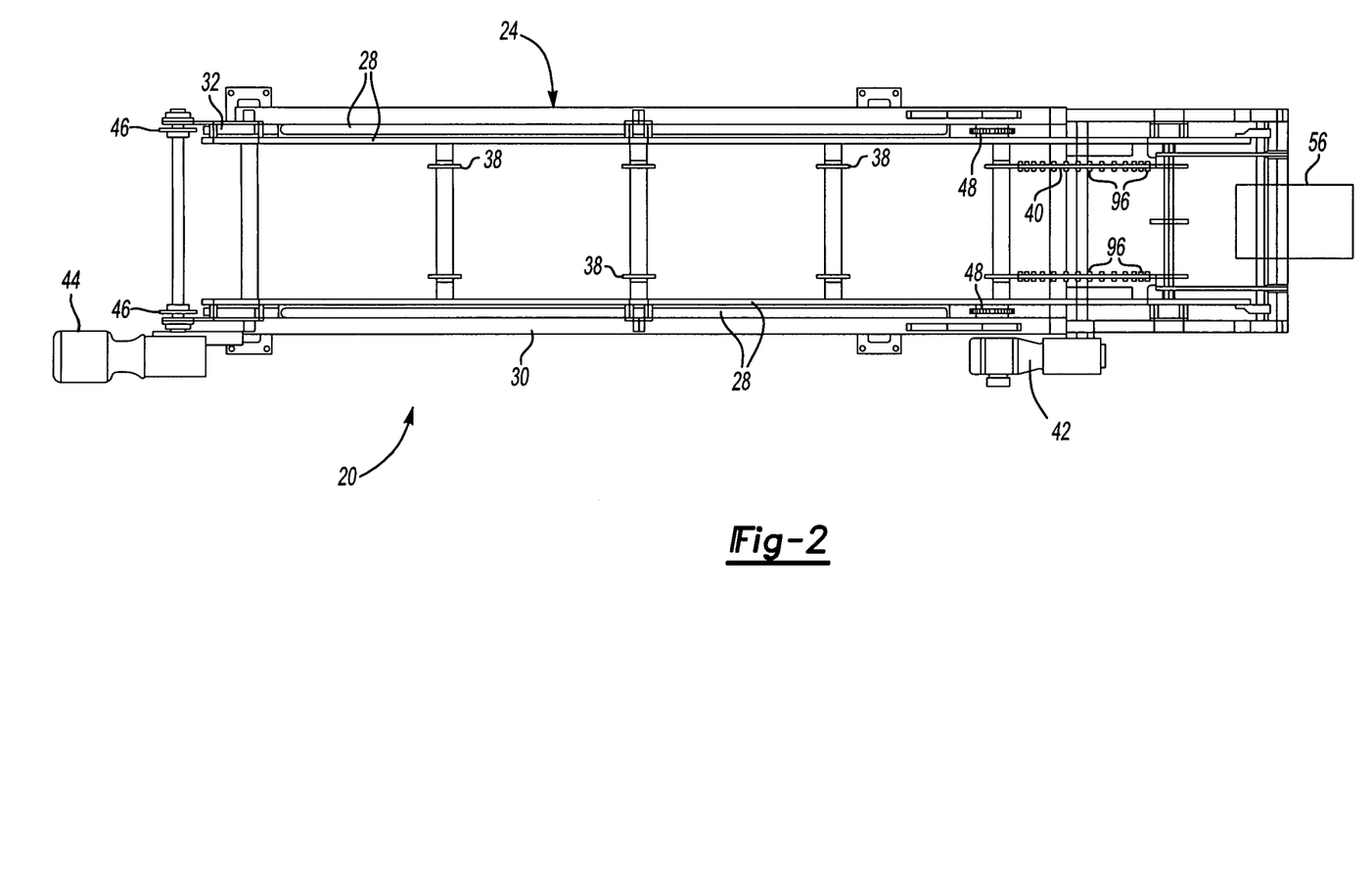
FIG. 2 is a top view of the support frame.
Figure 3:
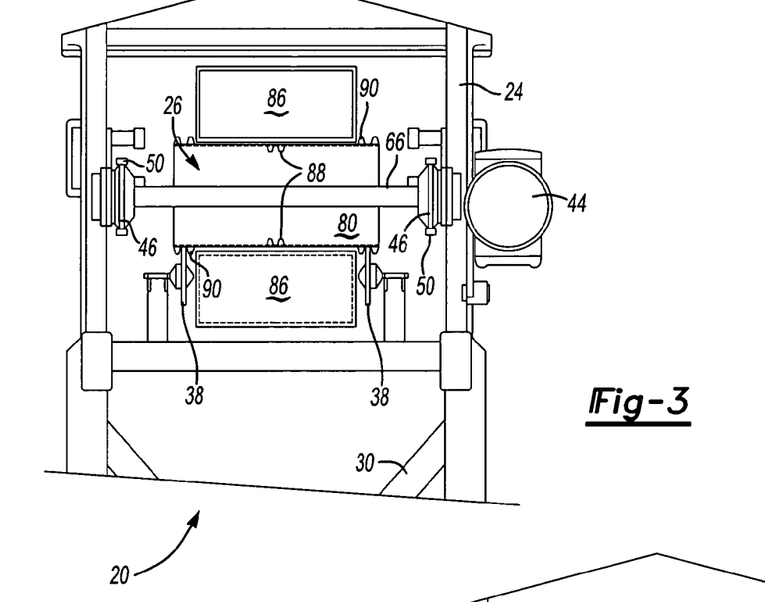
FIG. 3 is an end view of the conveyor assembly taken along line 3—3 of FIG. 1.
Figure 4:
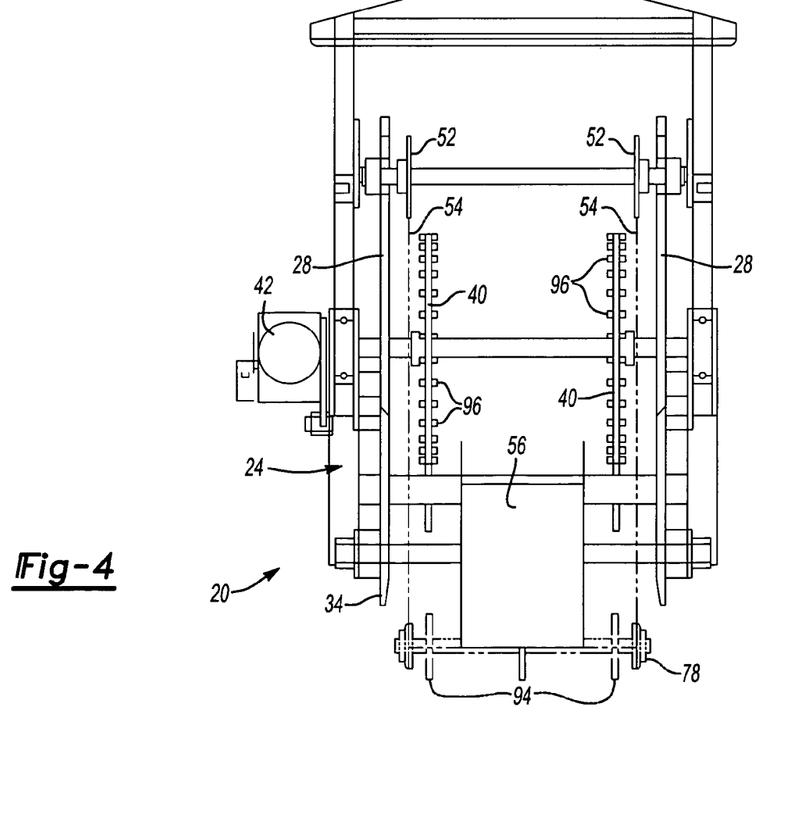
FIG. 4 is an opposing end view of the conveyor assembly taken along line 4—4 of FIG. 1.
Figure 5:
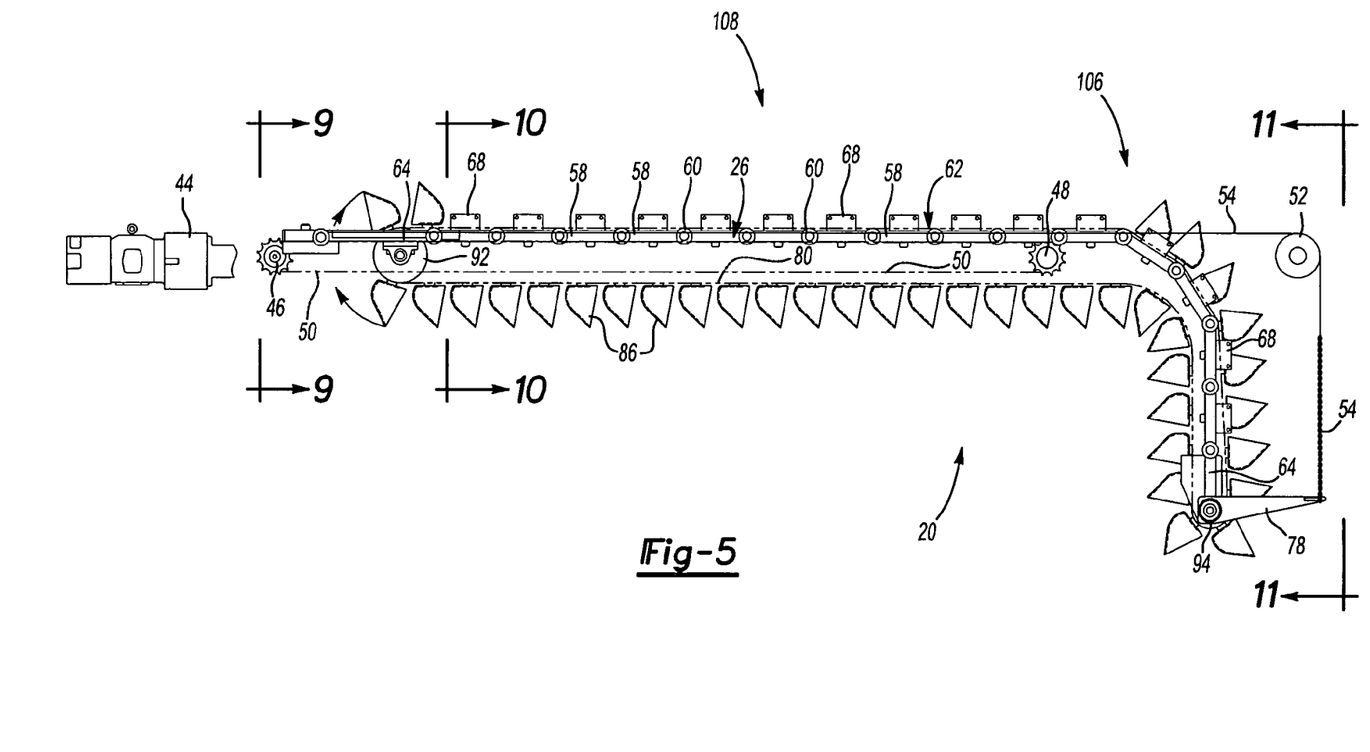
FIG. 5 is a partially fragmented side view of a closed conveyor of the conveyor assembly.
Figure 8:
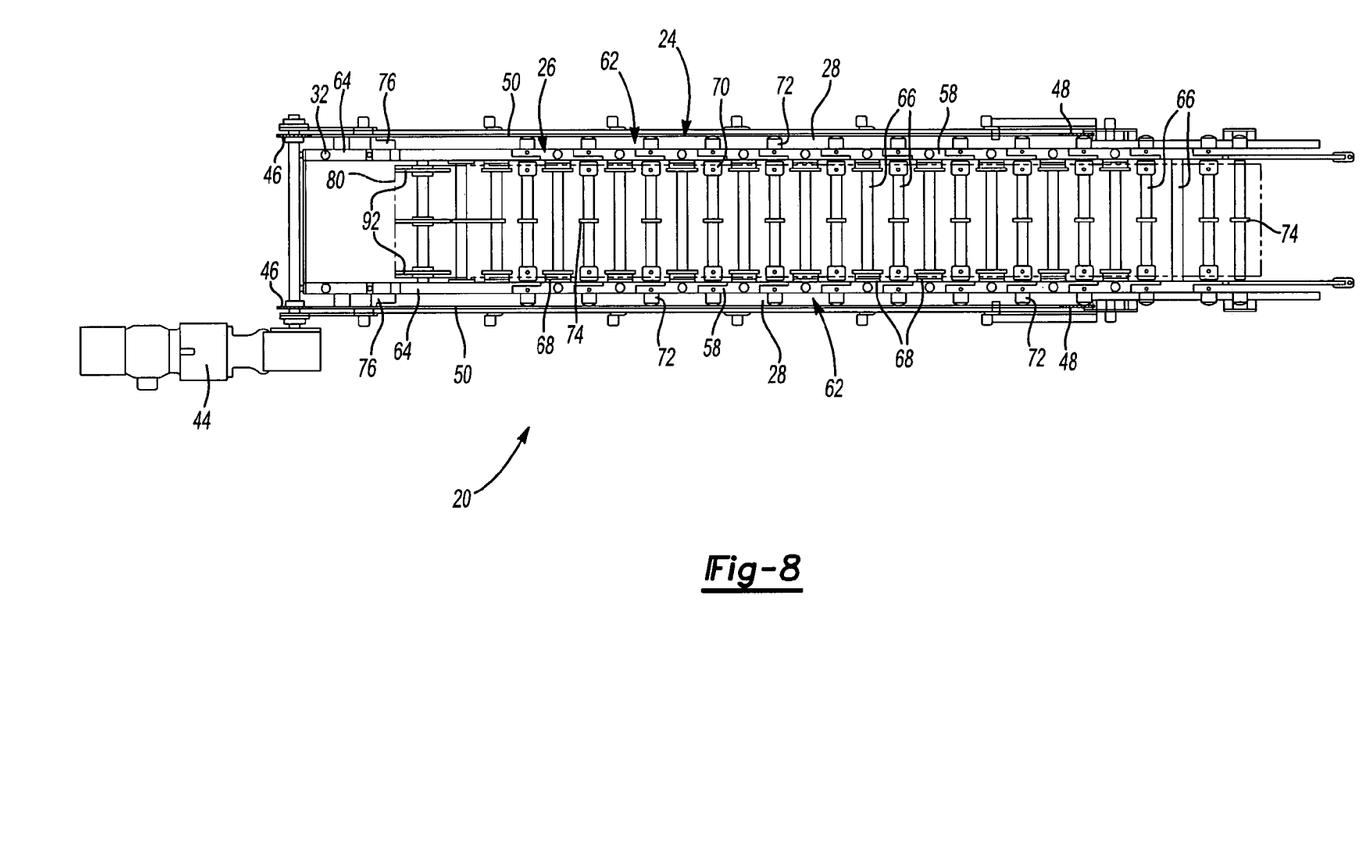
FIG. 8 is a top view of the closed conveyor.
Figure 9:
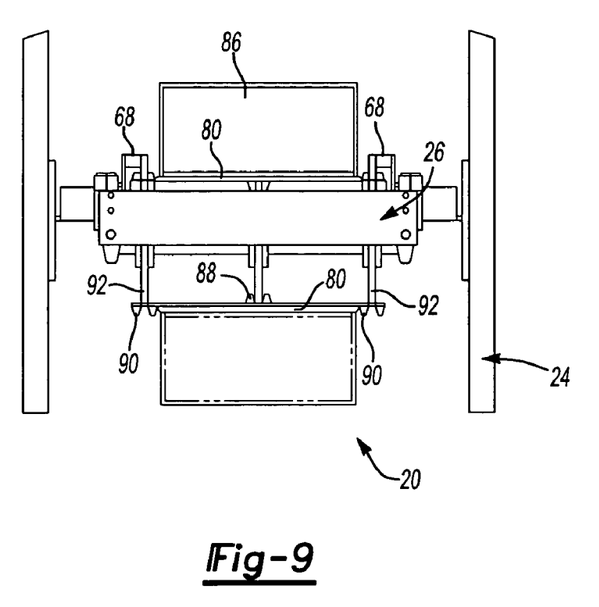
FIG. 9 is an end view of the closed conveyor taken along line 9—9 of FIG. 5.

A translator drive motor 44 is mounted to the support frame 24 adjacent the first end 32 of the rails 28. A translator drive sprocket 46, see FIG. 2, is attached to the translator drive motor 44 and is also mounted to the support frame 24 adjacent the first end 32 of the rails 28 on the horizontal portion. A translator idler sprocket 48 is mounted to the support frame 24 closer to the second end 34 of the rails 28 but still on the horizontal portion. As best shown in FIGS. 3, 5, and 8, two translator drive chains 50 span the space between the translator drive sprocket 46 and the translator idler sprocket 48 along the horizontal portion. The translator drive chains 50 are in closed parallel horizontal loops. The purpose and function of the translator drive chains 50 will be discussed in greater detail below.

Referring back to FIGS. 1–4, a tension sprocket 52 is further mounted to the support frame 24 at the transition portion of the rails 28. Specifically, the tension sprocket 52 is mounted outwardly from the rails 28. A tension chain 54 passes over the tension sprocket 52 and is connected to a portion of the closed conveyor 26 as will be discussed below.

Figure 1:
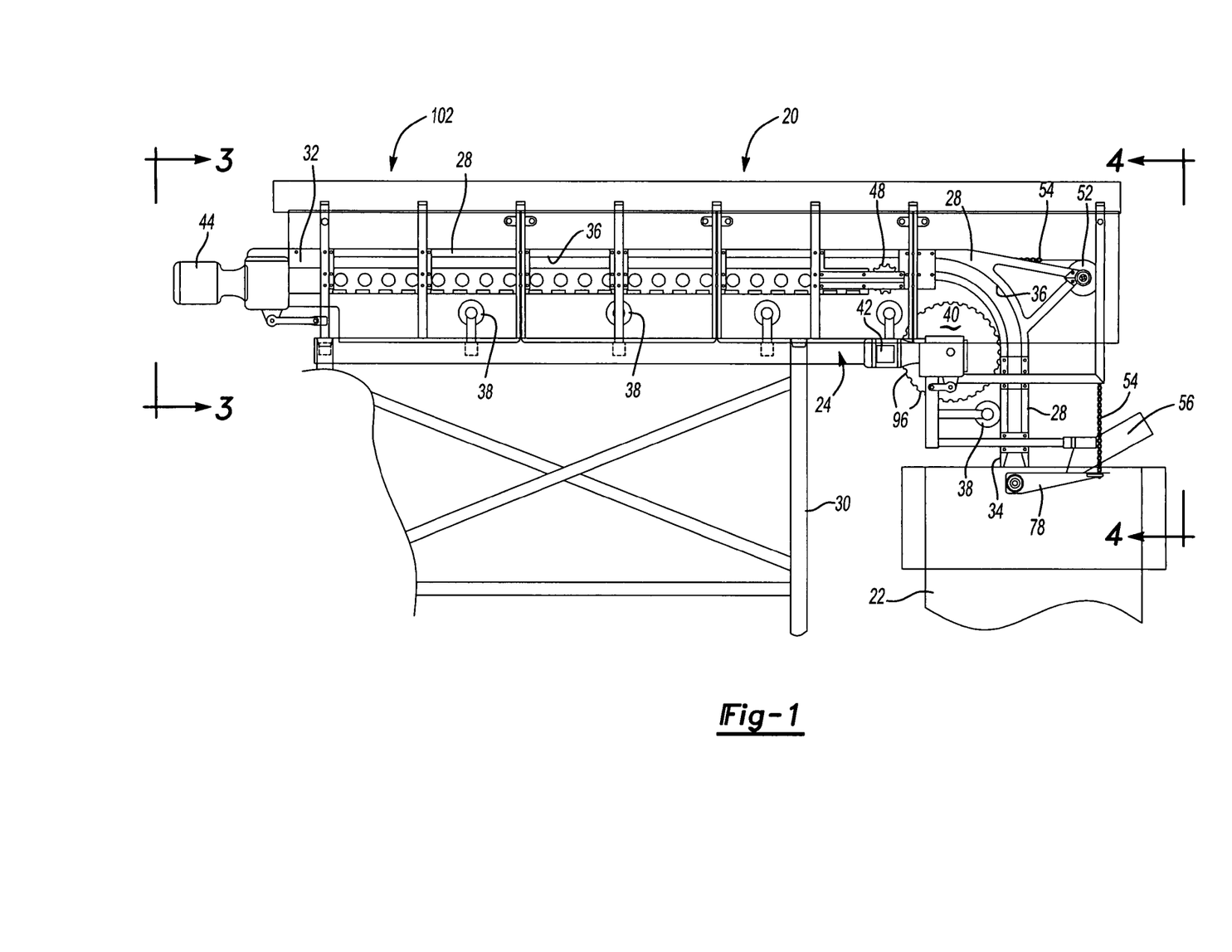
FIG. 1 is a partially fragmented side view of a support frame of a conveyor assembly.

As shown in FIG. 1, an infeed chute 56 is located in the vicinity of the second end 34 of the rails 28 below the transition portion and adjacent the vertical portion for providing product, such as food, to the conveyor assembly 20.

Figure 10:
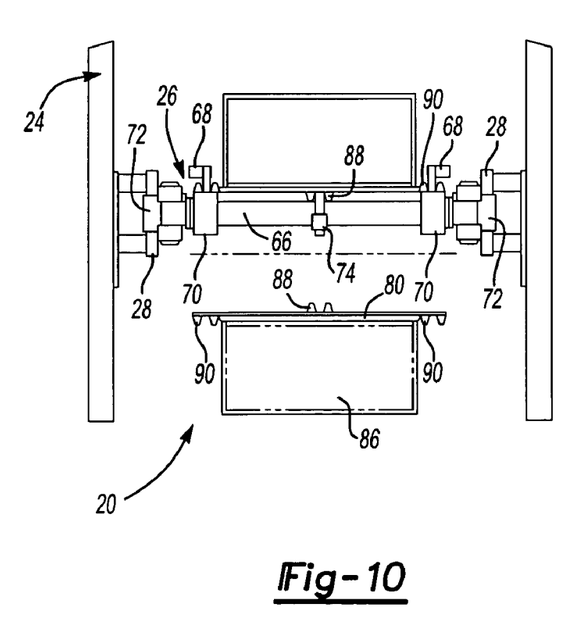
FIG. 10 is a partially cross-sectional view of the closed conveyor taken along line 10—10 of FIG. 5.
Figure 11:
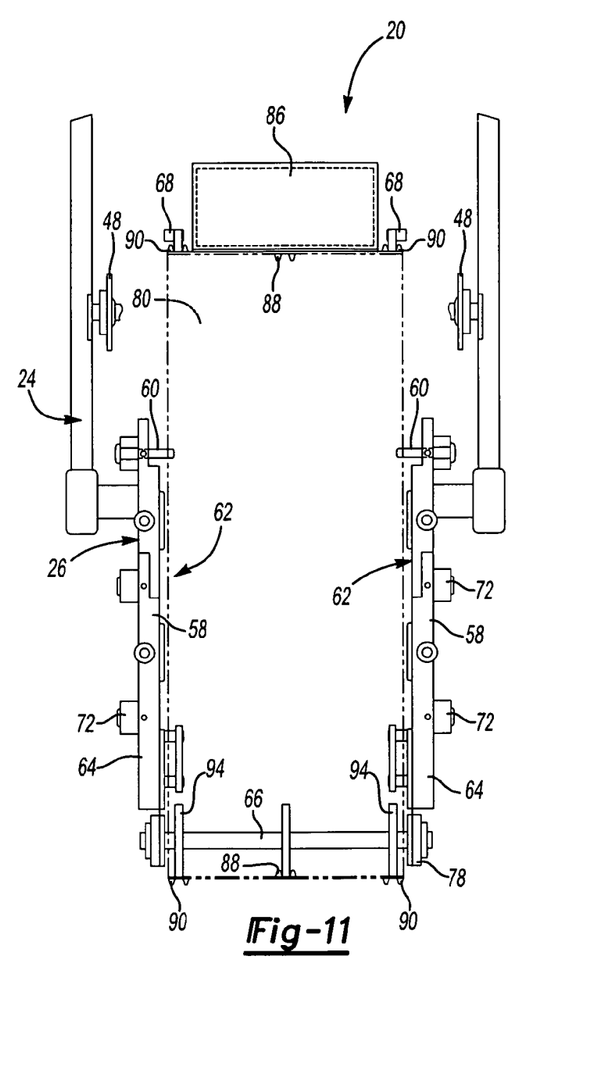
FIG. 11 is an end view of the closed conveyor taken along line 11—11 of FIG. 5.

Turning to FIGS. 5–11, the closed conveyor 26 is now discussed in greater detail. Similar to the rails 28 discussed above, the closed conveyor 26 has a vertical run portion and a horizontal run portion. As discussed above, the closed conveyor 26 is supported by the support frame 24. In particular, the closed conveyor 26 includes two series of interconnected links 58. Each link 58 is substantially rectangular with notches formed in both the leading and trailing edges. Each link 58 also includes an inner face and an outer face. As best shown in FIGS. 5 and 11, the individual links 58 are connected to each other through a pivot pin 60 to form the series of links 62. The series of links 62 define end links 64 that do not have a notch. The series of links 62 are parallel to each other with one series of links 62 coupled to one of the rails 28 and the other series of links 62 coupled to the other rail 28. The links 62 preferably pivot only one way around the pivot pin 60 when the series of links 62 move through the transition portion of the rails 28. In other words, adjacent links 58 pivot relative to one another over an angular ranges of less than 270 degrees, preferably substantially 180 degrees. The links 62 define the bendable frame assembly 108. The configuration of the notches define which way the links 62 pivot about the pivot pin 60. Alternatively, the notches may be eliminated or the links 62 otherwise re-configured to allow for pivoting in both directions. This alternative configuration of the links 62 could be implemented if there was more than one curved transition portion and/or if there was a backward bend. It should be appreciated that the links 62 may be of any suitable size or configuration depending upon various design criteria.

As best shown in FIGS. 8 and 10, cross-link tubes 66 are attached to the inner faces of the links 58 to interconnect the two series of links 62 and to provide support for the series of links 62. Some of the cross-link tubes 66 include a series of slide shoes 68 for guiding a portion of the closed conveyor 26. Many of the other cross-link tubes 66 include belt support rollers 70, link support rollers 72, and belt support discs 74. The belt support rollers 70 are disposed on the same selected tubes 66 approximate to the inner face of the links 58. The link support rollers 72 are disposed on the same selected tubes 66 approximate the outer face of the links 58. Also, the belt support discs 74 are centrally supported on the same selected tubes 66. The belt support rollers 70 and belt support discs 74 work in conjunction with the slide shoes 68 on the other tubes 66 and the belt support wheels 38 on the support frame 24 to support and guide another portion of the closed conveyor 26 as discussed below. The link support rollers 72 ride within the rails 28 to support and guide the closed conveyor 26 through the horizontal and vertical portions of the rails 28.

As discussed above, the translator drive motor 44, translator drive sprockets 46, and translator idler sprockets 48 are all mounted to the support frame 24. As also mentioned above, the translator drive chain 50 interconnects each of the translator drive sprockets 46 to a corresponding translator idler sprocket 48. As best shown in FIG. 8, the translator drive chains 50 are each mounted to an outer face of one of the end links 64 by way of a chain bracket 76. The translator drive motor turns the translator drive sprocket 46 which in turn causes the translator drive chains 50 to traverse the closed loop 98 formed between the translator drive sprocket 46 and the translator idler sprocket 48. The movement of the translator drive chains 50, which are mounted to one of the end links 64, causes the series of links 62 to move along the rails 28 to change the respective lengths of the horizontal and vertical run portions. The translating of the series of links 62 causes the interconnected links 58 to pivot at the transition portion of the rails 28, causing the closed conveyor 26 to take an L-shaped route. The translating of the series of links 62 thus causes the vertical run portion to extend and retract, and the horizontal run portion to oppositely retract and extend depending on the direction of rotation of the translator drive motor 44, translator drive sprockets 46 and the translator drive chain 50. Furthermore, through this system, the sum of the lengths of the vertical run portion and the horizontal run portion of the closed conveyor 26 remains constant.

A cable torque arm 78 is mounted to one of the end links 64. The tension chain 54 traverses over the tension sprocket 52 and is mounted at one end to a second bracket on the links 58 and at the other end to the cable torque arm 78. The tension chain 54 provides constant tension to the ends of the series of links 62 as the series of links 62 moves through the transition portion of the rails 28. The support provided by the tension chain 54 maintains the vertical run portion of the closed conveyor 26 in a substantially perpendicular relationship with the horizontal run portion. Hence, the vertical run portion of the closed conveyor 26 extends unsupported from the rails 28.

Figure 6:
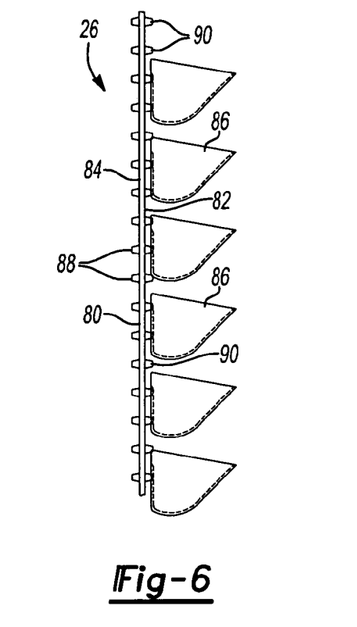
FIG. 6 is a fragmented side view of a belt supporting a series of buckets.
Figure 7:
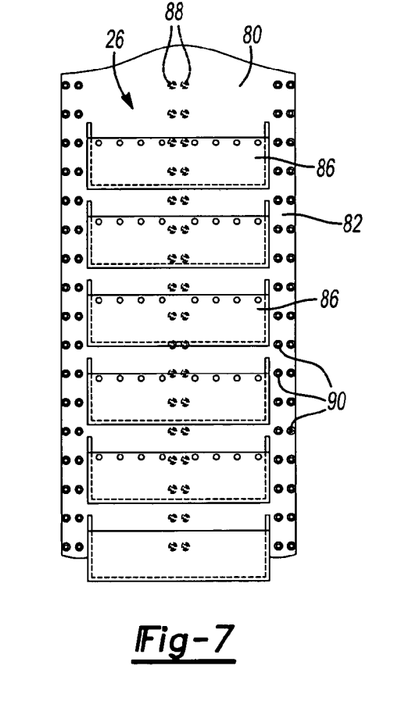
FIG. 7 is a fragmented front view of the belt and buckets.

The closed conveyor 26 also includes a conveying member in the form of a belt 80 having an outer surface 82 and an inner surface 84. In alternative embodiments of the invention, the conveying member could be a chain or hingedly-connected plates. The belt 80 may be formed of any suitable material depending upon the product requirements. As best shown in FIGS. 6 and 7, a series of buckets 86 are supported on the outer surface 82 of the belt 80. In particular, the buckets 86 are bolted to the belt 80 in such a manner so as to cause openings in the buckets 86 to face upwards as the belt 80 travels down the vertical run portion. Alternatively, the buckets 86 may be mounted such that the openings in the buckets 86 face downwards as the belt 80 travels down the vertical run portion. It should be appreciated that the buckets 86 may be of any suitable size or configuration as desired.

The belt 80 includes a row of bottom guides 88 mounted to the inner surface 84 and two rows of top guides 90 mounted to the outer surface 82. The bottom guides 88 engage the belt support disc 74 on the tubes 66 (see FIG. 10). The top guides 90 engage the slide shoes 68 on one side of the closed conveyor 26 (see FIGS. 9 and 10) and the belt support wheels 38 on the other side of the closed conveyor 26 (see FIG. 3). The engagement of the belt 80 with the belt support discs 74, slide shoes 68, and belt support wheels 38 support and guide the belt 80 as the belt 80 moves relative to the support frame 24.

As discussed above, the belt drive sprocket 40 is located at the transition portion of the rails 28. A first supporting member formed as a belt infeed pulley 92 is mounted to one of the end links 64 of the series of links 62 and a second supporting member is formed as a tail pulley 94 is mounted to the other end link of the series of links 62. In alternative embodiments of the invention, one or both of the first and second supporting members could be formed as a rod, a roller, a spindle, a wheel, a shaft, a gear, or sprocket. The tail pulley 94 is mounted adjacent the cable torque arm 78. The belt 80 traverses an L-shaped route from horizontal to vertical formed by the infeed pulley 92, the belt drive sprocket 40, and the tail pulley 94. In particular, the belt drive motor 42 and belt drive sprocket 40 causes the belt 80 to move in a continuous manner to lower the product into the large bag 22. Two series of tabs 96 are formed on the belt drive sprocket 40 to engage the rows of bottom guides 88 to provide the necessary interengagement between the belt drive sprocket 40 and the belt 80 to move the belt 80.

The infeed chute 56 is located in the vicinity of the vertical run portion for delivering product into the buckets 86 as the buckets 86 traverse the vertical run portion. A vertically displaceable discharge point of the closed conveyor 26 is defined by the area near the tail pulley 94 and cable torque arm 78. The movement of the belt 80 around the tail pulley 94 causes the buckets 86 to discharge. The vertically displaceable discharge point moves in relation to the extending or retracting of the series of links 62 caused by the movement of the series of links 62 along the route provided by the rails 28.

Figure 12:
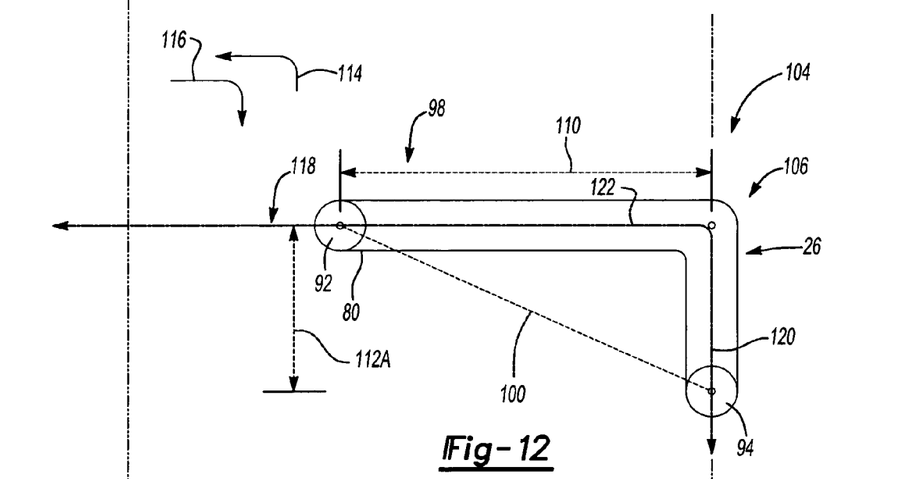
FIG. 12 is a schematic view of the closed conveyor in a first position along a path of movement.
Figure 13:
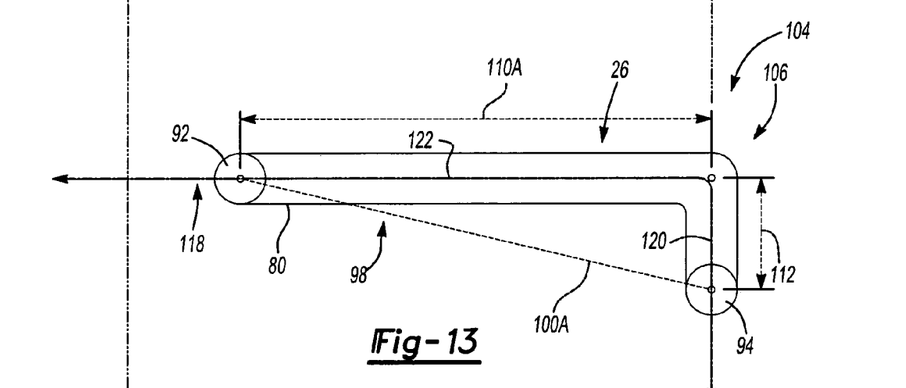
FIG. 13 is a schematic view of the closed conveyor in a second position along the path of movement.
Figure 14:
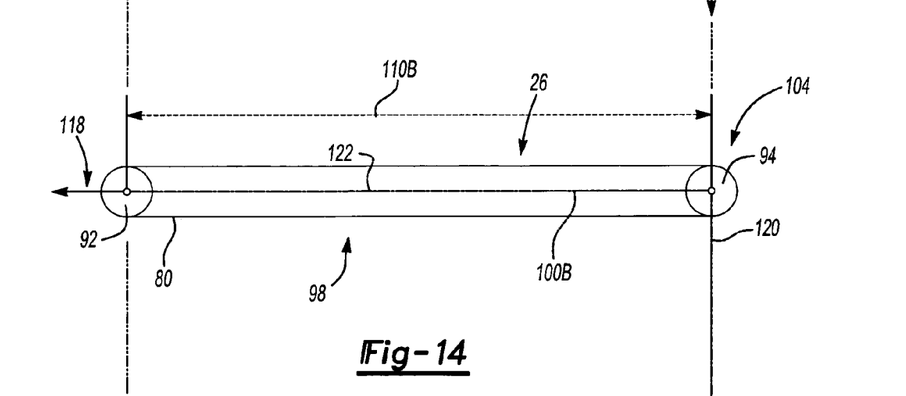
FIG. 14 is a schematic view of the closed conveyor in a third position along the path of movement.

Referring now to FIG. 12, the first distance 100 includes a horizontal distance component 110 and a vertical distance component 112a which inversely change with respect to one another in response to movement of the first and second supporting members 92, 94 along the path 104. For example, as shown by a comparison of FIGS. 12–14, the horizontal distance component 110 increases to a horizontal distance component 110a and further increases to a horizontal distance component 110b as the first and second supporting members 92, 94 along the path 104 in a first direction 114. An opposite comparison of FIGS. 14, 13 and 12 shows movement of the first and second supporting members 92, 94 along the path 104 in a second direction 116, which is an opposite direction than the first direction 114. A vertical distance component 112 shown in FIG. 13 increases to the vertical distance component 112a in response to movement of the first and second supporting members 92, 94 along the path 104 in the second direction 116.

In another aspect of the exemplary embodiment of the invention, the distance between the first and second supporting members 92, 94 decreases in response to movement of the first and second supporting members 92, 94 along the path 104 in the second direction 116. As shown by a comparison of FIGS. 12–14, a first distance 100b is greater than the a first distance 100a, which is greater than a first distance 100. Similarly, the first distance increases in response to movement in the first direction 114.

In another aspect of the exemplary embodiment of the invention, the first supporting member 92 moves away the bend 106 in response to translation along the path 104 in the first direction 114 and moves closer to the bend 106 in response to translation along the path 104 in the second direction 116. Similarly, the second supporting member 94 moves away the bend 106 in response to translation along the path 104 in the second direction 116 and moves closer to the bend 106 in response to translation along the path 104 in the first direction 114.

In the exemplary embodiment of the invention, the belt 80 remains taut during movement of the first and second supporting members 92, 94 along the path 104.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An apparatus comprising:
   a conveying member defining a loop;
   first and second supporting members individually disposed at opposite sides of said loop and spaced a first distance apart from one another;
   a moving device operable to translate said first and second supporting members concurrently along a path having at least one bend, wherein said moving device further comprises a bracket fixedly associated with said bendable frame assembly, first and second sprockets disposed on opposite sides of said bracket, a chain engaged with said bracket and extending around both of said first and second sprockets, and a motor operable to rotate one of said first and second sprockets; and
   a bendable frame assembly extending between said first and second supporting members within said loop and movable with said first and second supporting members along said path and around said at least one bend.

2. The apparatus of claim 1 wherein said bendable frame assembly moves in a first direction along said path in response to rotation of said one of said first and second sprockets in a first angular direction and moves in a second direction along said path in response to rotation of said one of said first and second sprockets in a second angular direction, wherein said first and second angular directions are opposite of one another.

3. The apparatus of claim 1 wherein said bendable frame assembly is further defined as being bendable in only one direction.

4. The apparatus of claim 1 wherein said bendable frame assembly further comprises:
   a plurality of links pivotally associated with one another.

5. The apparatus of claim 4 wherein adjacent links are pivotal over an angular range less than 270 degrees.

6. The apparatus of claim 1 further comprising:
   a second frame assembly supporting said bendable frame assembly during movement of said bendable frame assembly along said path, wherein said second frame assembly defines said path.

7. The apparatus of claim 6 further comprising:
   a third sprocket mounted to said second frame assembly and engaging said conveying member such that conveying member rotates in response to rotation of said third sprocket.

* * * * *

UNITED STATES PATENT AND TRADEMARK OFFICE
CERTIFICATE OF CORRECTION

PATENT NO. : 7,080,730 B2 Page 1 of 1
APPLICATION NO. : 10/899953
DATED : July 25, 2006
INVENTOR(S) : David C. Ours et al.

It is certified that error appears in the above-identified patent and that said Letters Patent is hereby corrected as shown below:

Column 2, line 65, "navels" should be --travels--.

Column 7, line 18, Claim 1 "movable" should be --moveable--.

Signed and Sealed this

Twelfth Day of December, 2006

JON W. DUDAS
*Director of the United States Patent and Trademark Office*